No. 668,561. Patented Feb. 19, 1901.
C. A. GODDARD.
MOP PRESS.
(Application filed July 10, 1900.)
(No Model.)
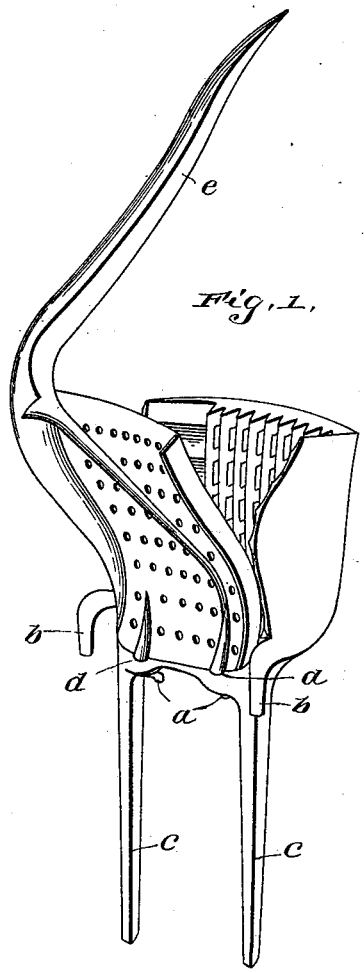
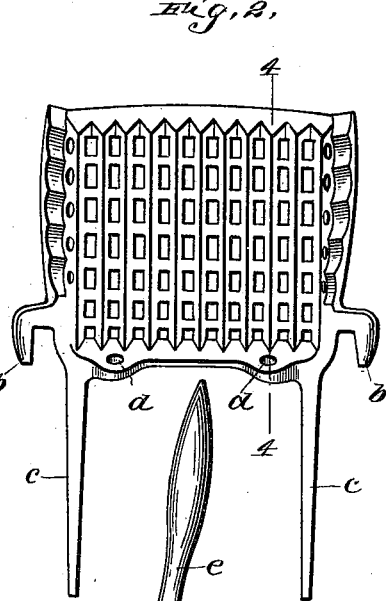
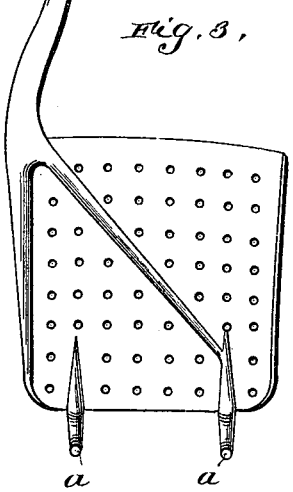
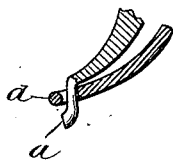
Witnesses:
Inventor:
Clarence A. Goddard

UNITED STATES PATENT OFFICE.

CLARENCE A. GODDARD, OF AKRON, OHIO.

MOP-PRESS.

SPECIFICATION forming part of Letters Patent No. 668,561, dated February 19, 1901.

Application filed July 10, 1900. Serial No. 23,159. (No model.)

*To all whom it may concern:*

Be it known that I, CLARENCE A. GODDARD, a citizen of the United States, residing at Akron, in the county of Summit and State of Ohio, have invented a new and useful Mop-Press—a machine for removing the water from mop or cloth when scrubbing—of which the following is a specification.

My invention relates to a mop-press preferably made in two pieces of cast-iron.

In the accompanying drawings, illustrating my invention, in the several figures of which like parts are similarly designated, Figure 1 is an assembled view shown in perspective. Fig. 2 is an elevation showing the body of the press. Fig. 3 is an elevation showing the follower. Fig. 4 is a section taken in the line 4 4, Fig. 2, showing lug $a$ of the follower projecting through hole $d$ in the press-body.

The body, Fig. 2, of the press is designed to fit in a bucket or other receptacle, with lugs $c$ $c$ on the inside and lugs $b$ $b$ hooked over the top and outside of the bucket, thus placing the body, Fig. 2, of the press over the bucket. The part for receiving the mop by its convex shape carries the mop well out over the bucket to prevent discharging water on the floor. The follower, Fig. 3, is placed with lugs $a$ $a$ through holes $d$ $d$ and by pressing down on the handle $e$ causing the follower, Fig. 3, to rotate about lugs $a$ $a$ in holes $d$ $d$, thereby closing the space between the body, Fig. 2, and follower, Fig. 3, which space is the receptacle for the mop when the water is pressed out. Both the body, Fig. 2, and the follower, Fig. 3, have openings for the purpose of allowing the water to escape when the mop is being pressed. To make a free discharge of water from the mop, I have made the body, Fig. 2, of a series of ribs, the ribs having a triangular cross-section, the apex of the triangle projecting toward the follower, Fig. 3. Lugs $a$ are made considerably longer than the thickness of the body, Fig. 2, at holes $d$ for the purpose of allowing the follower, Fig. 3, to lift when pressing the mop, thereby permitting the upper part of the follower, Fig. 3, to come in close to the body, Fig. 2, producing a more uniform pressure than if operated about a fixed pivot. (See Fig. 4.) The lower end of lug $a$ is made hook-shaped to prevent it leaving hole $d$, except when follower, Fig. 3, is opened out wide.

I am aware that prior to my invention numerous mop-wringers have been made. Therefore I do not claim a mop wringer or press, broadly.

What I do claim as my invention, and desire to secure by Letters Patent, is—

1. A mop-press body having a series of ribs with openings between the ribs for the escape of the water, the whole cast in one piece, substantially as shown.

2. The combination of a mop-press follower having a handle cast on one side of the follower and a mop-press body having a series of ribs with openings between the ribs for the escape of water, substantially as shown.

In testimony whereof I have signed my name to this specification in the presence of two subscribing witnesses.

CLARENCE A. GODDARD.

Witnesses:
 MAUD A. GOSTLIN,
 ARTHUR S. MOTLINGER.